United States Patent
Ieda et al.

(10) Patent No.: US 12,522,276 B2
(45) Date of Patent: Jan. 13, 2026

(54) STEERING DEVICE

(71) Applicant: TOYODA GOSEI CO., LTD., Kiyosu (JP)

(72) Inventors: Masaaki Ieda, Kiyosu (JP); Shintaro Nakamura, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 18/782,222

(22) Filed: Jul. 24, 2024

(65) Prior Publication Data
US 2025/0050934 A1 Feb. 13, 2025

(30) Foreign Application Priority Data

Aug. 9, 2023 (JP) .................. 2023-129757
Jul. 8, 2024 (JP) .................. 2024-109474

(51) Int. Cl.
*B62D 1/06* (2006.01)
*B60Q 3/283* (2017.01)
*B60R 16/02* (2006.01)

(52) U.S. Cl.
CPC .............. *B62D 1/06* (2013.01); *B60Q 3/283* (2017.02); *B60R 16/0207* (2013.01)

(58) Field of Classification Search
CPC .................................................... B60Q 3/283
See application file for complete search history.

(56) References Cited

U.S. PATENT DOCUMENTS

| | | | |
|---|---|---|---|
| 2016/0096543 A1* | 4/2016 | Naitou | H05B 3/34 219/204 |
| 2017/0079089 A1* | 3/2017 | Okazaki | H05B 3/18 |
| 2023/0104284 A1 | 4/2023 | Fujii et al. | |

FOREIGN PATENT DOCUMENTS

| | | |
|---|---|---|
| JP | 2016-165940 A | 9/2016 |
| JP | 2023-55420 A | 4/2023 |

* cited by examiner

*Primary Examiner* — Vicky A Johnson
(74) *Attorney, Agent, or Firm* — Posz Law Group, PLC

(57) ABSTRACT

A steering device includes a rotation part and a gripping part. The gripping part includes a core metal part symmetrical across the rotation part, and a covering part that covers the core metal part. The covering part has a first conductive part on one side with respect to a symmetrical plane of the core metal part, formed of a material having conductivity, and a second conductive part on the other side with respect to the symmetrical plane of the core metal part, formed of a material having conductivity. The first and the second conductive parts are arranged independently from each other. The steering device further includes a harness electrically connecting the first and the second conductive parts, and a detector that detect gripping condition of the gripping part based on change in capacitance generated in the first conductive part and the second conductive part.

3 Claims, 13 Drawing Sheets

STEERING DEVICE

CROSS REFERENCE TO RELATED APPLICATIONS

The present application claims the priority based on Japanese Patent Applications No. 2023-129757 filed on Aug. 9, 2023 and No. 2024-109474 filed on Jul. 8, 2024, the disclosure of which is hereby incorporated by reference in its entirety.

BACKGROUND

Field

The present disclosure relates to a steering device.

Related Art

Japanese Patent Laid-Open Publication No. 2016-165940 discloses the steering wheel having the function of detecting whether the steering wheel is gripped by an occupant. The steering wheel according to JP2016-165940A includes a rim part to be gripped and rotated by an occupant. The rim part has a substantially annular shape when viewed from the occupant. The core metal serving as the skeletal part of the rim part is surrounded by a soft covering part formed of polyurethane foam. The soft covering part is surrounded by an outer cover made up of three layers formed of different materials. The outermost layer of the outer cover is a soft layer formed of polyurethane foam. The intermediate layer of the outer cover is a base cloth formed of fibers. The innermost layer is a conductive layer formed of a conductive material. The conductive layer is a coating film formed by coating the base cloth on its inner side with a coating material having conductivity. The conductive layer provides conductivity to the entire outer cover, so that the outer cover functions as an electrode. When an occupant grips the rim part, a capacitance between the outer cover and the occupant then changes from the capacitance when the rim part is not gripped. A detection substrate detects the gripping condition of the rim part, on the basis of the change in capacitance.

SUMMARY

The steering wheel according to JP2016-165940A has the conductive layer arranged on the entire periphery of the rim part having a substantially ring-like shape. In the conductive layer, the potential at the portion where a power source is connected may differ from that at a portion which is away from the power connection portion. In some cases, the conductive layer may not be ideally and uniformly configured throughout. Accordingly, the steering wheel according to JP2016-165940A may experience variability in detection accuracy of gripping depending on differences in the gripped portions by an occupant.

The present disclosure may be embodied in the following aspects.

In one aspect of the present disclosure, a steering device is provided. The steering device, which is mounted on a moving object, includes a rotation part attached to the moving object so as to be rotatable, and a gripping part connected to the rotation part; the gripping part includes a core metal part configured to be symmetrical across the rotation part, and a covering part configured to at least partially cover the core metal part; the covering part has a first conductive part arranged on one side with respect to a symmetrical plane of the core metal part, formed of a material having conductivity, and a second conductive part arranged on the other side with respect to the symmetrical plane of the core metal part, formed of a material having conductivity; the first conductive part and the second conductive part are arranged independently from each other; the steering device further includes a harness electrically connecting the first conductive part and the second conductive part, and a detector electrically connected to the first conductive part and the second conductive part via the harness, configured to detect gripping condition of the gripping part based on change in capacitance generated in at least one of the first conductive part and the second conductive part.

The present disclosure may be embodied in various aspects, for example, a vehicle equipped with the steering device, and a method of producing the steering device.

DETAILED DESCRIPTION

A. First Embodiment

Figure 1:
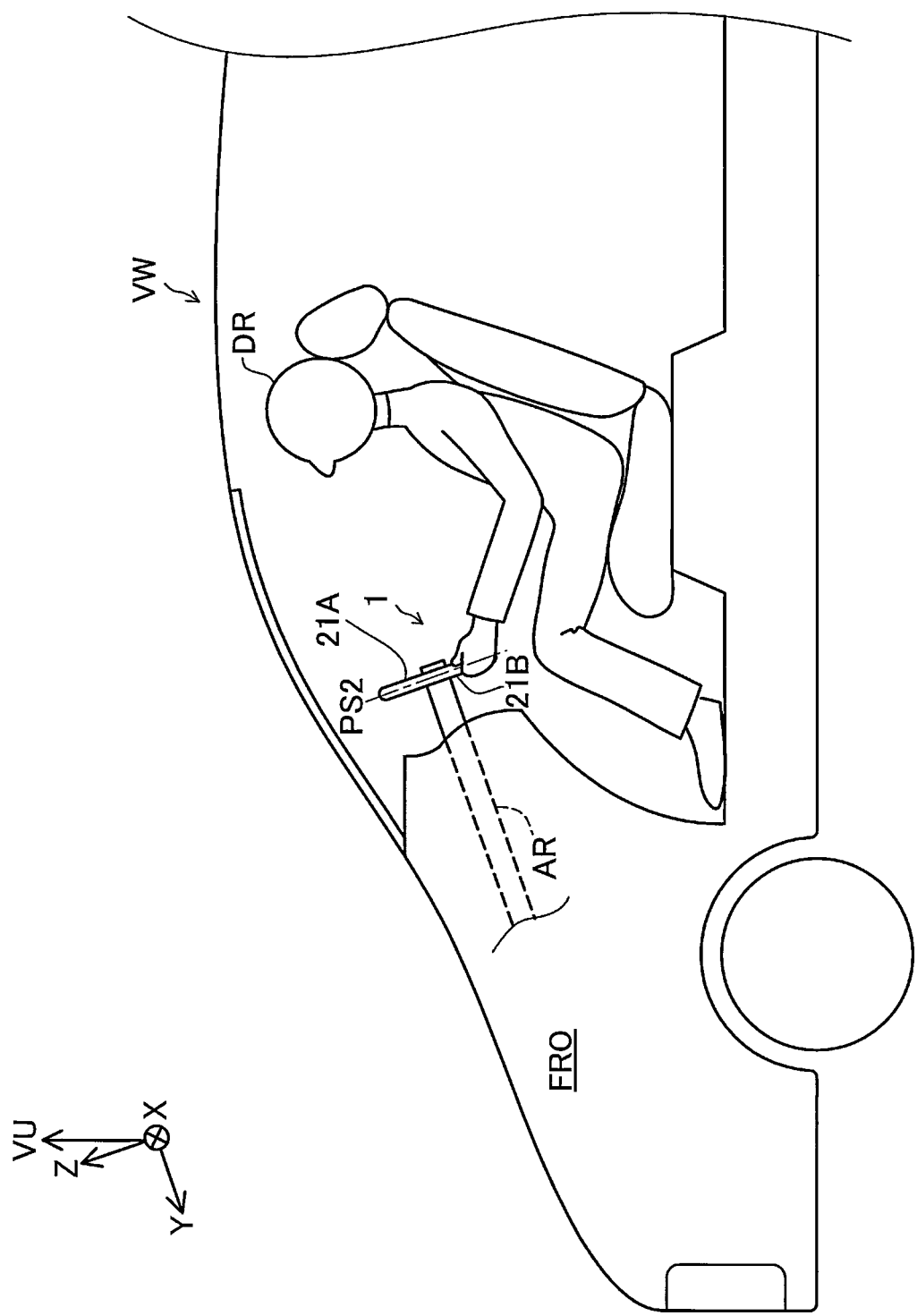
FIG. 1 is an explanatory diagram illustrating a vehicle equipped with a steering device in a first embodiment.

FIG. 1 is an explanatory diagram illustrating a vehicle VW equipped with a steering device 1 in the present embodiment. In FIG. 1, the steering device 1 is depicted in a simplified form. FIG. 1 shows an X axis, a Y axis, and a Z axis, which are mutually orthogonal. The X axis extends along the left-right direction of the vehicle VW. The direction from the front to the back of the paper of FIG. 1 is defined as the positive direction of the X axis. The Y axis is parallel to the extension direction of a rotation shaft AR which will be described later. The Z axis is orthogonal to the X axis and the Y axis. These also apply to FIG. 2 to FIG. 5, and FIG. 8 to FIG. 10 which will be described later. In FIG. 1, the vertical direction is represented by a VU axis. The upward direction in the vertical direction is defined as the positive direction of the VU axis.

Figure 2:
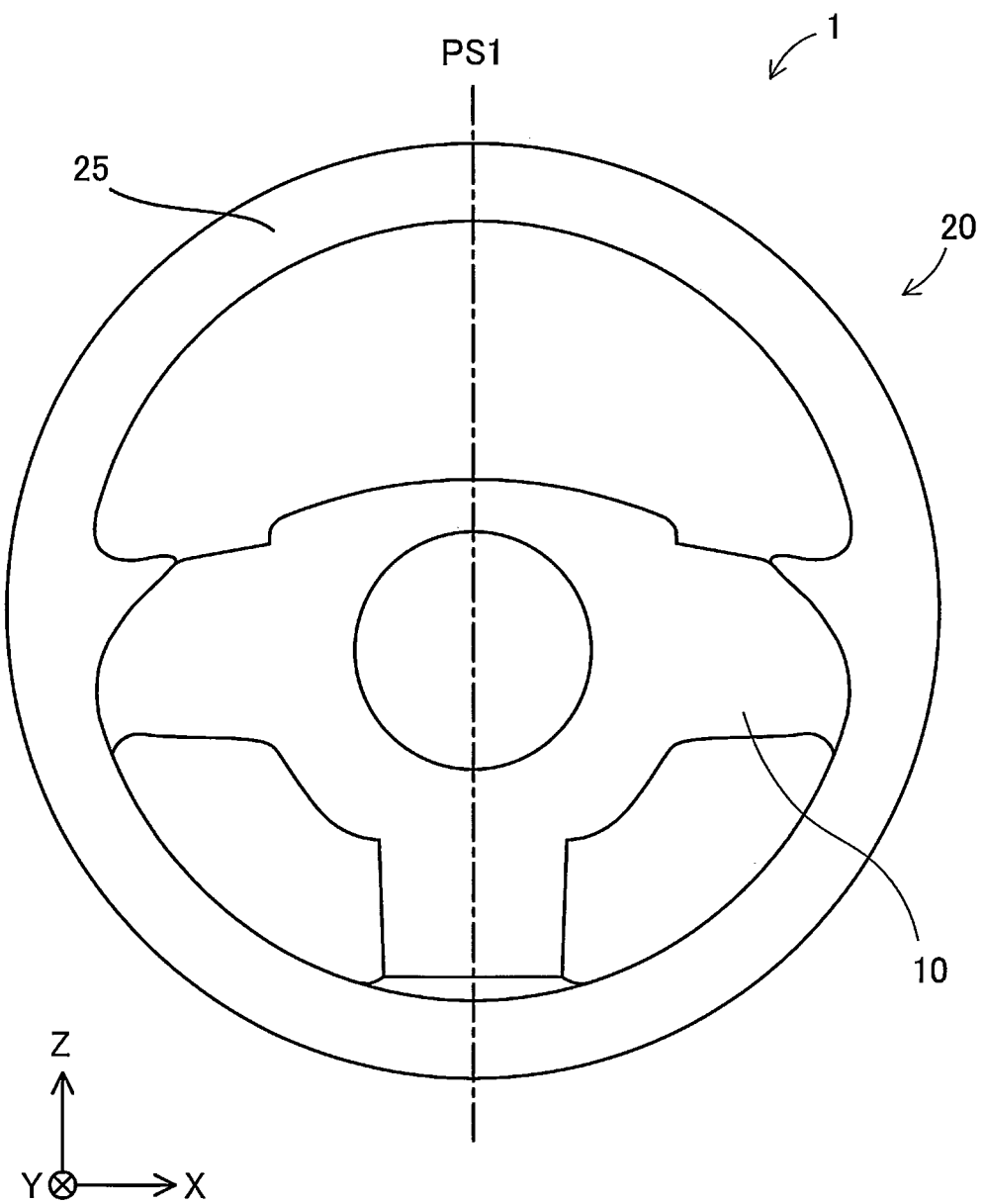
FIG. 2 shows the steering device shown in FIG. 1 when viewed toward the positive Y direction.
Figure 3:
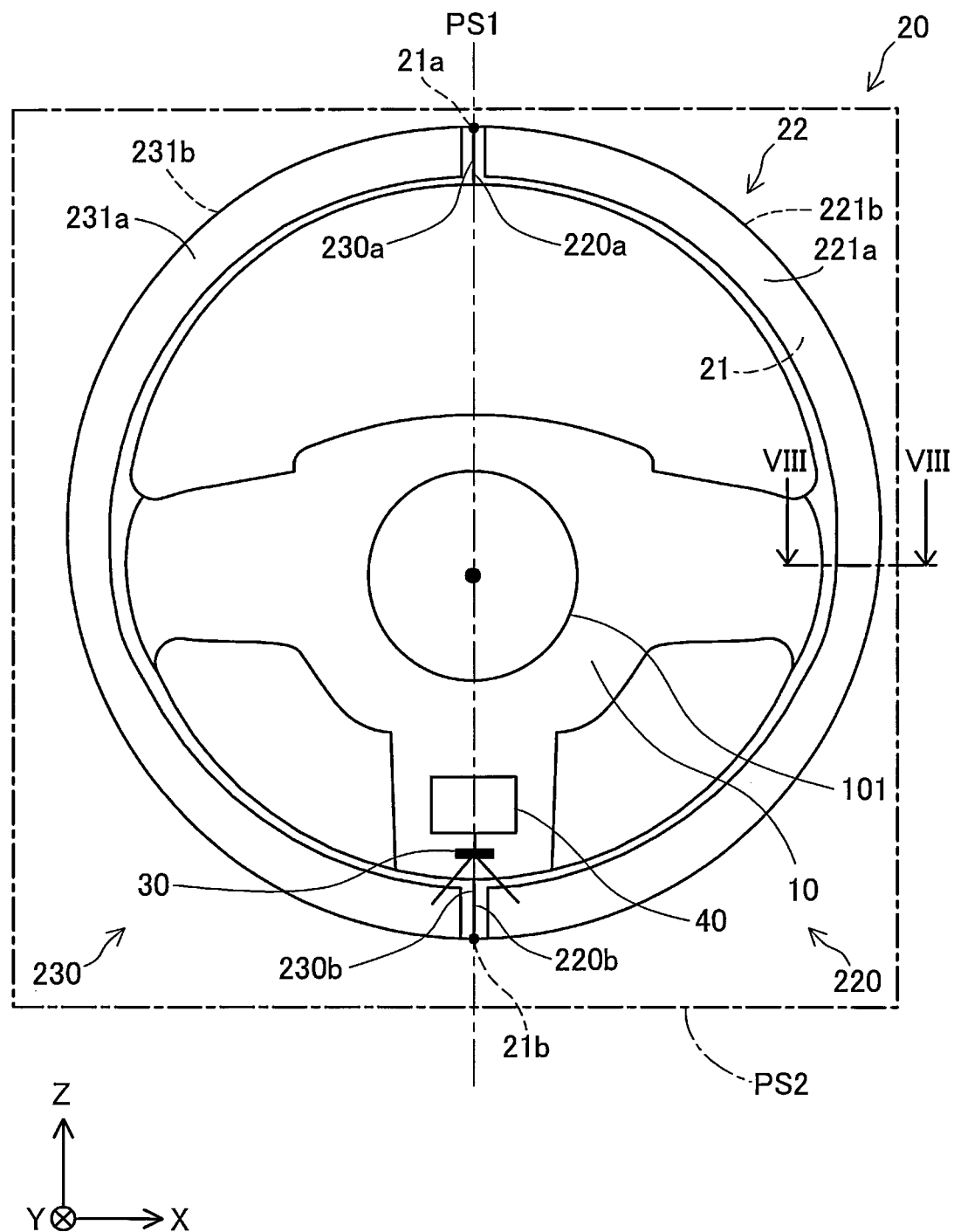
FIG. 3 shows the steering device shown in FIG. 2 without an outer cover.

FIG. 2 shows the steering device 1 shown in FIG. 1 when viewed toward the positive Y direction. In FIG. 2, the steering device 1 is depicted in a simplified form. FIG. 3 shows the steering device 1 shown in FIG. 2 without an outer cover 25. The outer cover 25 will be described later. The steering device 1 shown in FIG. 1 enables the steering of the vehicle VW through operation by a driver DR who is an occupant of the vehicle VW. The steering device 1 is connected to the rotation shaft AR which protrudes from the inside of a front part FRO of the vehicle VW (refer to the rotation shaft AR in FIG. 1). The steering device 1 is attached to the vehicle VW, via the rotation shaft AR. As shown in FIG. 2 and FIG. 3, the steering device 1 includes a rotation part 10, a gripping part 20, a harness 30, and a detector 40. In FIG. 2 and FIG. 3, the rotation shaft AR shown in FIG. 1 is omitted. The rotation shaft AR is omitted also in FIG. 4, FIG. 9, and FIG. 10.

The rotation part 10 is attached to the vehicle VW so as to be rotatable. Specifically, the rotation shaft AR shown in FIG. 1 is inserted through and fixed to a hole 101 which is formed in the rotation part 10, so that the rotation part 10 is attached to the vehicle VW so as to be rotatable. The rotation part 10 shown in FIG. 2 is connected to the gripping part 20. In the present embodiment, in the state where the rotation part 10 is not rotated, the rotation part 10 is symmetrical with respect to the plane including the Y axis and the Z axis. The position of the rotation part 10 where the symmetrical plane of the rotation part 10 includes the Y axis and the Z axis is referred to as "reference angle position of the rotation part 10". The state where the rotation part 10 is positioned at the reference angle position of the rotation part 10 is expressed as "the rotation part 10 is at the reference angle position". FIG. 2 shows the rotation part 10 which is at the reference angle position. These also apply to FIG. 3 to FIG. 5, FIG. 9, and FIG. 10.

Figure 4:
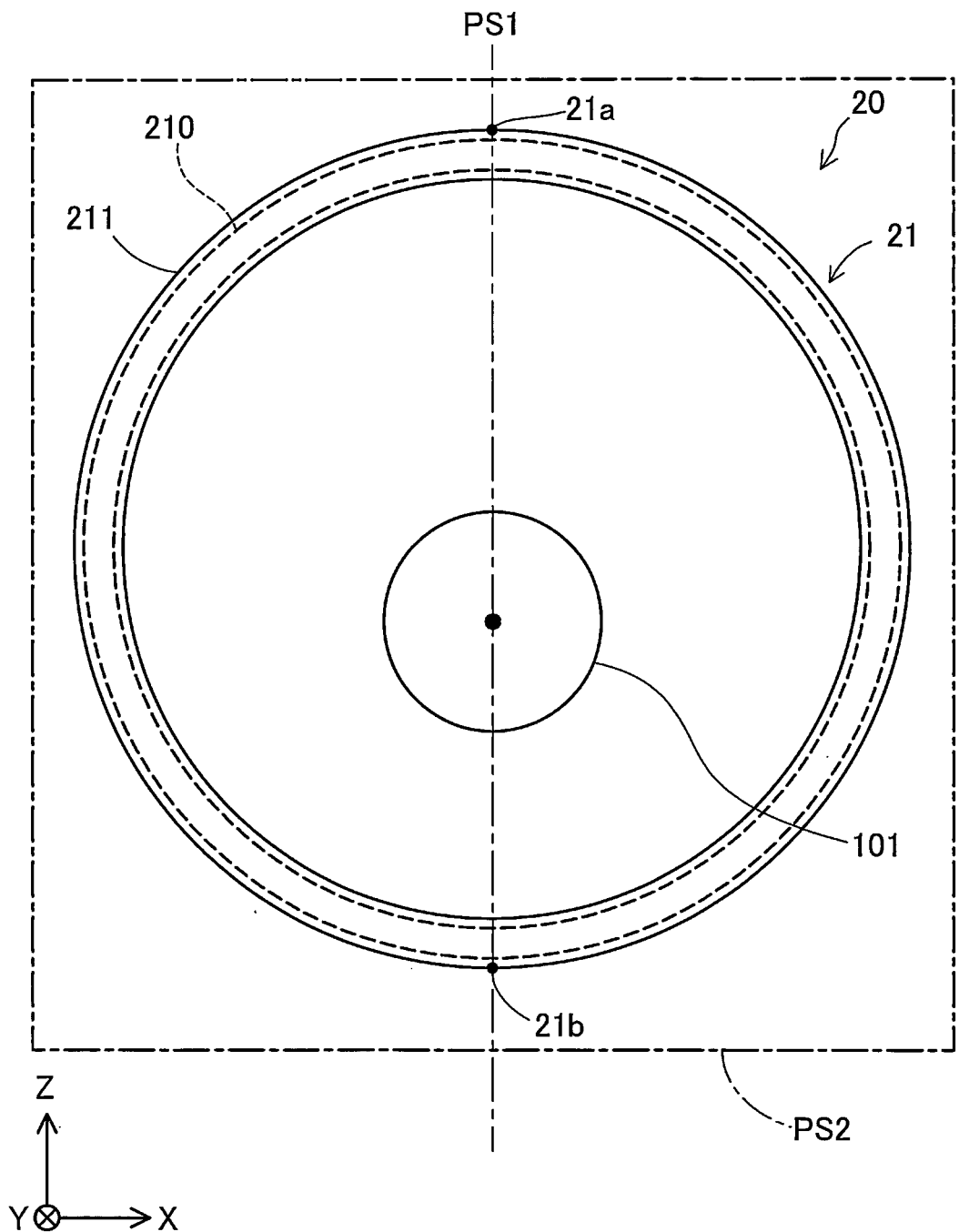
FIG. 4 shows the steering device shown in FIG. 3 without a first covering part or a rotation part.

FIG. 4 shows the steering device 1 shown in FIG. 3 without a first covering part 22 and the rotation part 10. In FIG. 4, the hole 101 formed in the rotation part 10 is illustrated for the sake of convenience. The first covering part 22 will be described later. The gripping part 20 is the part configured to be gripped by the driver DR who is an occupant of the vehicle VW. As shown in FIG. 2 to FIG. 4, the gripping part 20 includes a core metal part 21, the first covering part 22, and the outer cover 25.

The core metal part 21 shown in FIG. 4 is covered by the first covering part 22 and the outer cover 25 (refer to FIG. 2 and FIG. 3). As shown in FIG. 2 to FIG. 4, in the present embodiment, the core metal part 21 is configured to be symmetrical across the rotation part 10. In the present embodiment, the core metal part 21 is configured to be symmetrical with respect to a first symmetrical plane PS1 which is the plane including the Y axis and the Z axis, in the state where the rotation part 10 is at the reference angle position.

Figure 5:
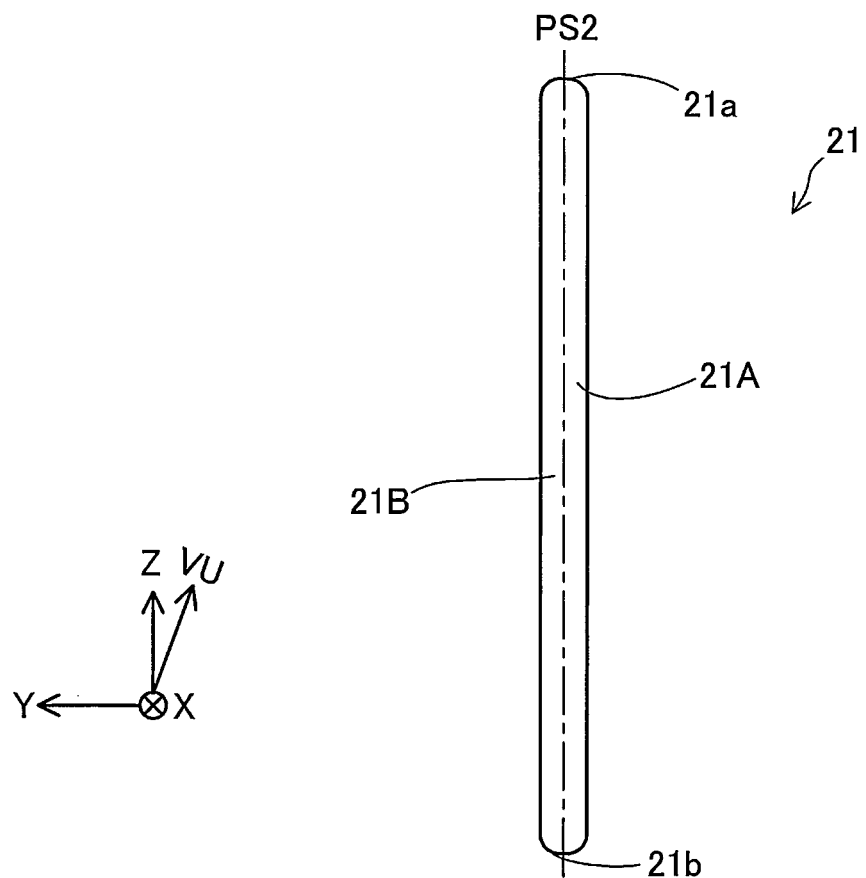
FIG. 5 shows the steering device shown in FIG. 4 when viewed toward the positive X direction.

FIG. 5 shows the core metal part 21 of FIG. 4 when viewed toward the positive X direction. FIG. 5 shows the VU axis. In the present embodiment, the core metal part 21 is configured to be symmetrical with respect to a second symmetrical plane PS2 which is the plane including the X axis and the Z axis, in the state where the rotation part 10 is at the reference angle position. As shown in FIG. 5, when the core metal part 21 is viewed in the X-axis direction, the second symmetrical plane PS2 passes through the center of the core metal part 21 in the Y direction. In the present embodiment, the surface of the core metal part 21 on the side facing an occupant is defined as a front-face part 21A, and the surface on the side opposite to the front-face part 21A is defined as a rear-face part 21B. Specifically, as shown in FIG. 1 and FIG. 5, the surface of the core metal part 21 on one side facing the occupant with respect to the second symmetrical plane PS2 is defined as the front-face part 21A. As shown in FIG. 1 and FIG. 5, the surface of the core metal part 21 on the other side with respect to the second symmetrical plane PS2 is defined as the rear-face part 21B.

As shown in FIG. 3 and FIG. 5, in the present embodiment, in the state where the rotation part 10 is at the reference angle position, a topmost part 21a corresponding to the highest part of the core metal part 21 in the vertical direction is positioned on the upper side in the vertical direction with respect to the rotation part 10. In the state where the rotation part 10 is at the reference angle position, a bottommost part 21b corresponding to the lowest part of the core metal part 21 in the vertical direction is positioned on the lower side in the vertical direction with respect to the rotation part 10. In the present specification, "the upper side in the vertical direction with respect to the rotation part 10" means the range upper than the range occupied by the rotation part 10 in the vertical direction. The state where a certain object A "is positioned on the upper side in the vertical direction with respect to the rotation part 10" does not mean that the object A is positioned right above the rotation part 10 in the vertical direction. In other words, when the object A is projected in the vertical direction, the position of the object A in the horizontal direction may not overlap with the position of the rotation part 10. Similarly, in the present specification, "the lower side in the vertical direction with respect to the rotation part 10" means the range lower than the range occupied by the rotation part 10 in the vertical direction. The state where a certain object A "is positioned on the lower side in the vertical direction with respect to the rotation part 10" does not mean that the object A is positioned right below the rotation part 10 in the vertical direction. In other words, when the object A is projected in the vertical direction, the position of the object A in the horizontal direction may not overlap with the position of the rotation part 10. As shown in FIG. 4, in the present embodiment, the core metal part 21 has an annular shape when viewed in the Y direction. The core metal part 21 includes a core metal 210 and a soft covering part 211.

The core metal 210 serves as the frame part of the core metal part 21. The core metal 210 is covered by the soft covering part 211. As shown in FIG. 2 to FIG. 4, the core metal 210 is configured to be symmetrical across the rotation part 10. In the present embodiment, the core metal 210 has an annular shape when viewed in the Y direction. The core metal 210 is formed of an alloy such as iron, aluminum, or magnesium. The core metal 210 is connected to the fixing member which is arranged on the inner periphery of the core metal 210 so as to extend in the X-axis direction. The fixing member is not illustrated in the figures. The fixing member is formed of the same material as the core metal 210. The fixing member has a hole allowing connection with the rotation shaft AR described above, when viewed in the Y-axis direction. The soft covering part 211 protects the core metal 210 by covering the core metal 210. In the present embodiment, the soft covering part 211 is formed of polyurethane foam.

Figure 6:
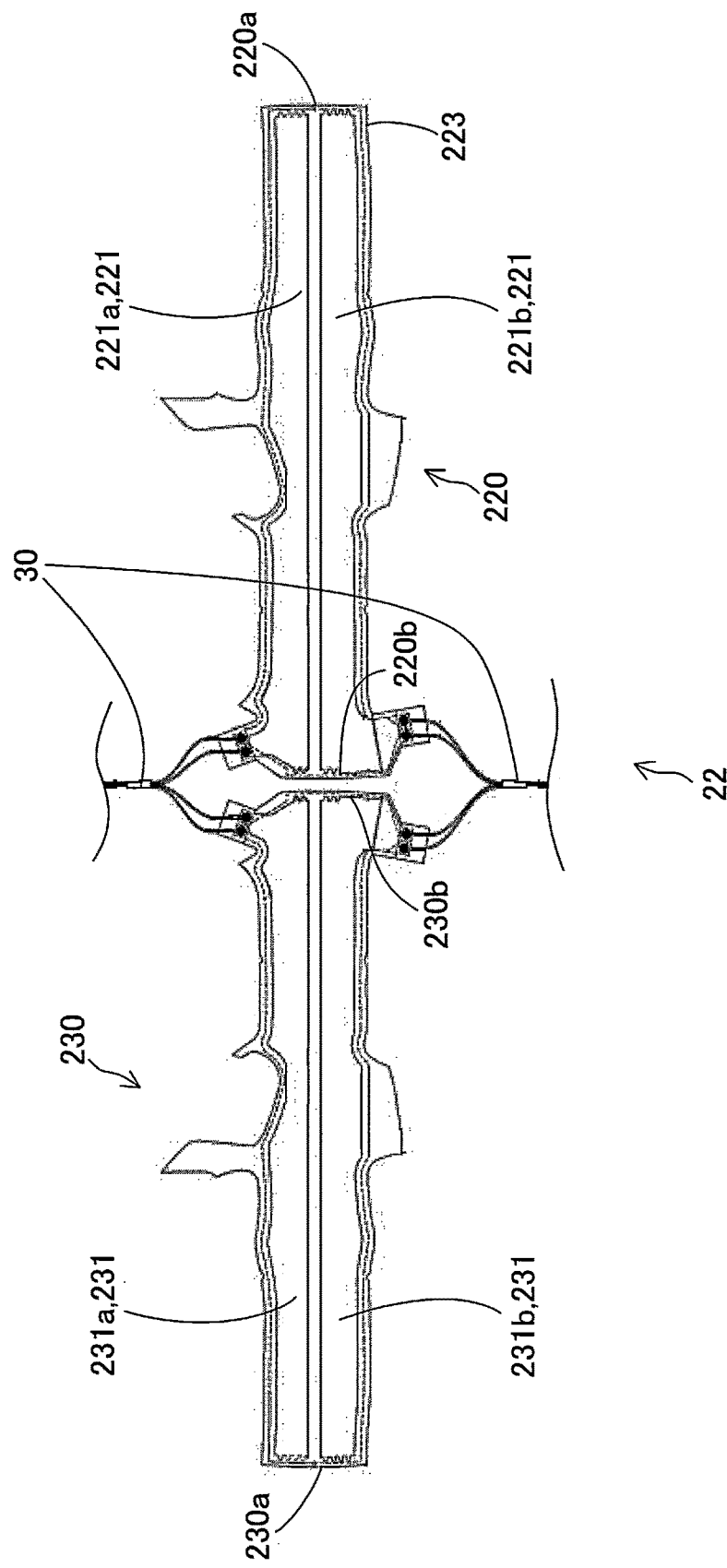
FIG. 6 shows the first covering part in the state not covering a core metal part, and a harness.
Figure 7:
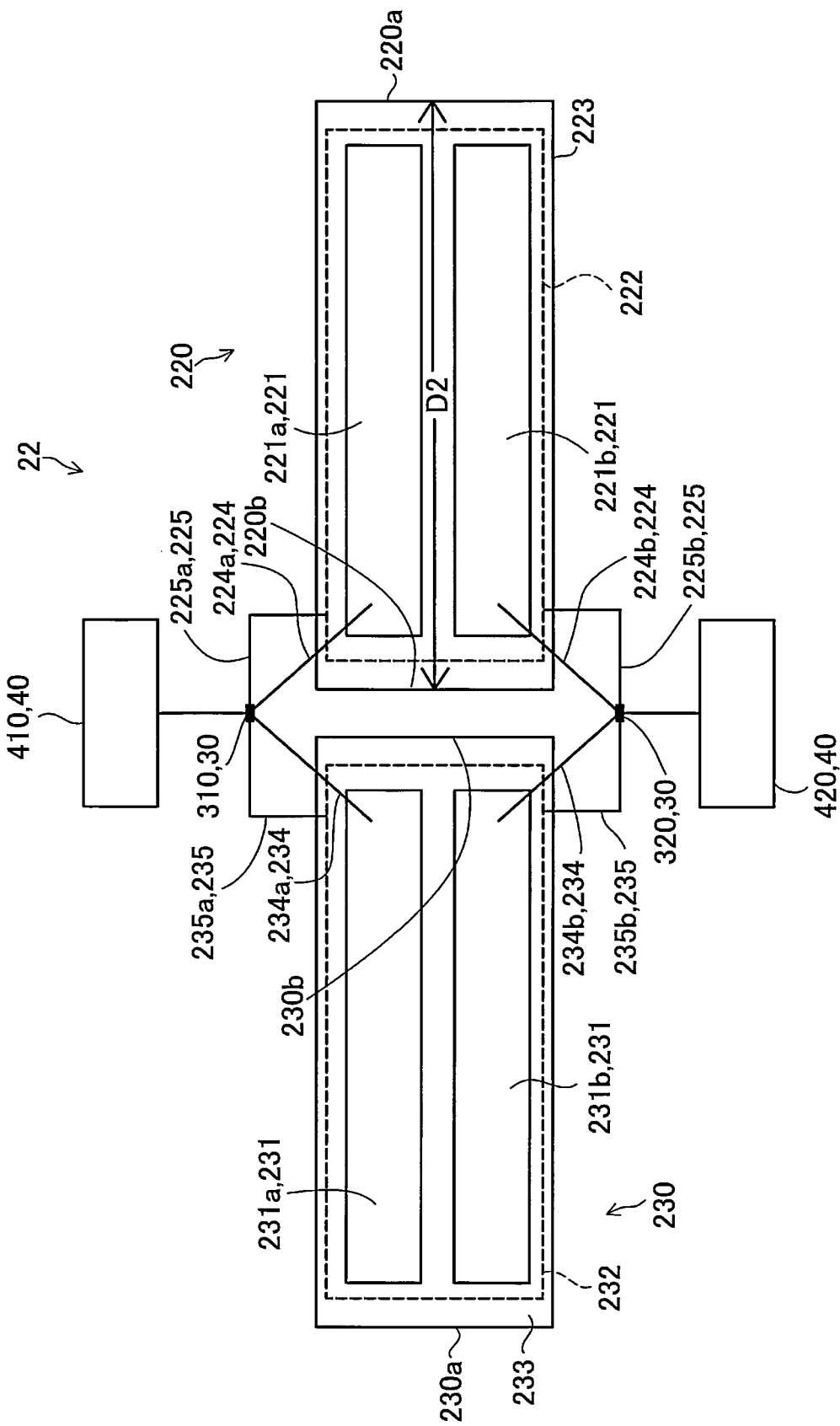
FIG. 7 is a schematic diagram of FIG. 6.

FIG. 6 shows the first covering part 22 in the state not covering the core metal part 21, and the harness 30. FIG. 7 is a schematic diagram of FIG. 6. In FIG. 7, the detector 40 is illustrated to facilitate understanding. The first covering part 22, along with the outer cover 25, functions as an electrode. As shown in FIG. 3, in the present embodiment, the first covering part 22 is arranged along the outer periphery and the inner periphery of the core metal part 21, when viewed in the Y-axis direction. The first covering part 22 is positioned from the topmost part 21a of the core metal part 21 to the bottommost part 21b. In the present embodiment, the first covering part 22 covers the entire core metal part 21. As shown in FIG. 3, FIG. 6, and FIG. 7, the first covering part 22 includes a first detection part 220 and a second detection part 230.

As shown in FIG. 3, the first detection part 220 is arranged on one side with respect to the first symmetrical plane PS1 of the core metal part 21. As shown in FIG. 3, in the present embodiment, the first detection part 220 is arranged on the positive X-direction side with respect to the first symmetrical plane PS1 of the core metal part 21. The first detection part 220 is arranged on the outer surface of the core metal part 21 so that, as shown in FIG. 3, one end part 220a of the first detection part 220 shown in FIG. 6 is in contact with the topmost part 21a of the core metal part 21. Moreover, the first detection part 220 is arranged on the outer surface of the core metal part 21 so that, as shown in FIG. 3, the other end part 220b of the first detection part 220 shown in FIG. 6 is in contact with the bottommost part 21b of the core metal part 21. As shown in FIG. 6, the first detection part 220, in the state not covering the core metal part 21, has a substantially rectangular appearance. As shown in FIG. 7, the first detection part 220 includes a first conductive part 221, a first shield part 222, a first insulating part 223, a first conductive terminal 224, and a first shield terminal 225.

Figure 8:
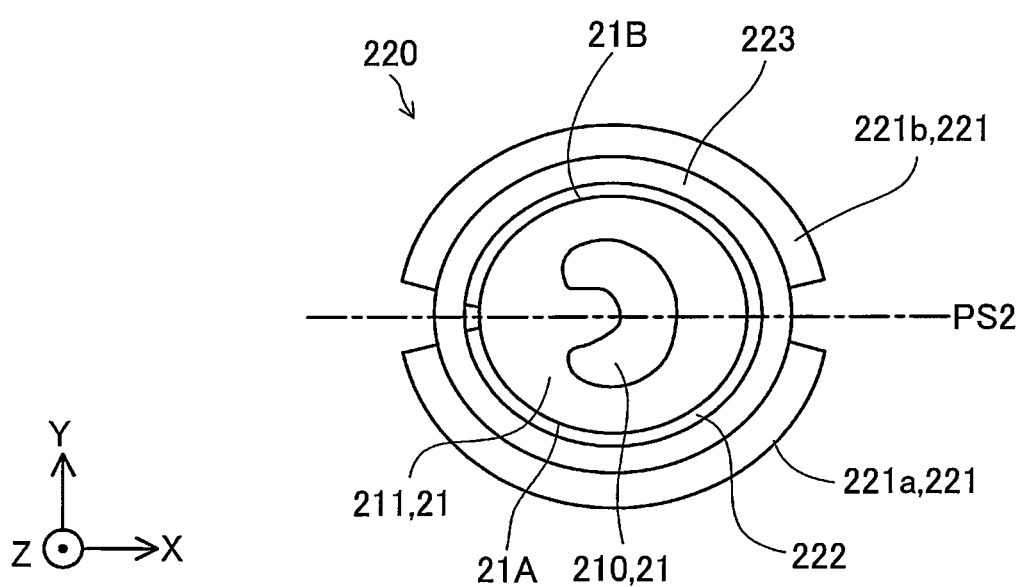
FIG. 8 shows a cross-sectional view of the steering device shown in FIG. 3 along a line VIII-VIII.

FIG. 8 shows the cross-sectional view of the steering device 1 shown in FIG. 3 along a line VIII-VIII. In FIG. 8, the rotation part 10 is omitted. The first conductive part 221, along with the outer cover 25, functions as a detection electrode for detecting a capacitance between the first conductive part 221 and the driver DR. The first conductive part 221 is arranged on the outer surface of the core metal part 21. As shown in FIG. 8, the first shield part 222 and the first insulating part 223 are arranged between the first conductive part 221 and the core metal part 21. In the present specification, the state where the first conductive part 221 is arranged on the outer surface of the core metal part 21 includes not only the case where the first conductive part 221 is arranged directly on the outer surface of the core metal part 21, but also the case where at least one of the first shield part 222 and the first insulating part 223 is arranged between the first conductive part 221 and the core metal part 21. This also applies to a second conductive part 231 which will be described later. As shown in FIG. 3, the first conductive part 221 is arranged on the positive X-direction side corresponding to one side with respect to the first symmetrical plane PS1 of the core metal part 21.

The first conductive part 221 is formed of a material having conductivity. In the present embodiment, the first conductive part 221 is the coating film formed by coating the first insulting part 223 with a coating material having conductivity. A mixture of coating resin and powder of conductive carbon or metal oxide may be used as the coating material having conductivity. As shown in FIG. 7 and FIG. 8, the first conductive part 221 includes a first front conductive part 221a and a first rear conductive part 221b.

As shown in FIG. 8, the first front conductive part 221a is arranged so as to be in contact with the front-face part 21A of the core metal part 21 on the side facing the occupant. In the present specification, the state where the first front conductive part 221a is arranged so as to be in contact with the front-face part 21A of the core metal part 21 includes not only the case where the first front conductive part 221a is in direct contact with the front-face part 21A, but also the case where at least one of the first shield part 222 and the first insulating part 223 is arranged between the first front conductive part 221a and the front-face part 21A. Specifically, as shown in FIG. 8, the first front conductive part 221a is arranged on the negative Y-direction side corresponding to one side with respect to the second symmetrical plane PS2 of the core metal part 21. As shown in FIG. 3, the first front conductive part 221a is positioned from the vicinity of the topmost part 21a of the core metal part 21 to the vicinity of the bottommost part 21b. As shown in FIG. 8, the first rear conductive part 221b is arranged so as to be in contact with the rear-face part 21B of the core metal part 21 on the opposite side of the front-face part 21A. In the present specification, the state where the first rear conductive part 221b is arranged so as to be in contact with the rear-face part 21B of the core metal part 21 includes not only the case where the first rear conductive part 221b is in direct contact with the rear-face part 21B, but also the case where at least one of the first shield part 222 and the first insulating part 223 is arranged between the first rear conductive part 221b and the rear-face part 21B. Specifically, the first rear conductive part 221b is arranged on the positive Y-direction side corresponding to the other side with respect to the second symmetrical plane PS2 of the core metal part 21. The first rear conductive part 221b is positioned from the vicinity of the topmost part 21a of the core metal part 21 to the vicinity of the bottommost part 21b. In the present embodiment, the first rear conductive part 221b has the same length as the length of the first front conductive part 221a, along the outer periphery of the core metal part 21.

The first shield part 222 shown in FIG. 7 and FIG. 8 has the function of shielding a capacitance between the core metal 210 and the first conductive part 221. Although not illustrated, the first shield part 222 is grounded. As shown in FIG. 8, the first shield part 222 is arranged on the surface of the first insulating part 223 opposite to the surface on which the first conductive part 221 is arranged. The shape of the first shield part 222 will be described later. The first shield part 222 is formed by coating the first insulting part 223 with a coating material containing a material having conductivity. The first shield part 222 is arranged between the core metal 210 and the first conductive part 221, thereby enabling stable detection by use of the first conductive part 221, as to whether the gripping part 20 is gripped.

The first insulating part 223 insulates the first conductive part 221 and the first shield part 222. The first insulating part 223 is arranged between the first conductive part 221 and the first shield part 222. As shown in FIG. 6, the first insulating part 223 has a sheet-like shape. As shown in FIG. 7 and FIG. 8, the first conductive part 221 is arranged on one side surface of the first insulating part 223, while the first shield part 222 is arranged on the other surface thereof (refer to the frame illustrated with a broken line in FIG. 7). As shown in FIG. 8, in the state where the first covering part 22 covers the core metal part 21, the other surface of the first insulating part 223 faces the core metal part 21.

The first conductive terminal 224 shown in FIG. 7 electrically connects the first conductive part 221 and the harness 30. The first conductive terminal 224 includes a first front conductive terminal 224a and a first rear conductive terminal 224b. The first front conductive terminal 224a electrically connects the first front conductive part 221a and the harness 30. In the present embodiment, the first front conductive terminal 224a is positioned closer to the other end part 220b of the first detection part 220 than to the one end part 220a. The first rear conductive terminal 224b electrically connects the first rear conductive part 221b and the harness 30. In the present embodiment, the first rear conductive terminal 224b is positioned closer to the other end part 220b of the first detection part 220 than to the one end part 220a.

The first shield terminal 225 electrically connects the first shield part 222 and the detector 40. In detail, the first shield terminal 225 electrically connects the first shield part 222 and the detector 40, via the harness 30. The first shield terminal 225 includes a first front shield terminal 225a and a first rear shield terminal 225b. In the present embodiment, the first front shield terminal 225a is positioned closer to the other end part 220b of the first detection part 220 than to the one end part 220a, and closer to the first front conductive part 221a than to the first rear conductive part 221b. In the present embodiment, the first rear shield terminal 225b is positioned closer to the other end part 220b of the first detection part 220 than to the one end part 220a, and closer to the first rear conductive part 221b than to the first front conductive part 221a.

As shown in FIG. 3, the second detection part 230 is arranged on the other side with respect to the first symmetrical plane PS1 of the core metal part 21. In the present embodiment, the second detection part 230 is arranged on the negative X-direction side with respect to the first symmetrical plane PS1 of the core metal part 21. The second detection part 230 has the same shape and the same function as those of the first detection part 220. The second detection part 230 in the present embodiment is configured to be symmetrical to the first detection part 220 with respect to the first symmetrical plane PS1. As shown in FIG. 7, the second detection part 230 includes a second conductive part 231, a second shield part 232, a second insulating part 233, a second conductive terminal 234, and a second shield terminal 235. In the description below of the second detection part 230, the same configurations as those of the first detection part 220 may be omitted.

The second conductive part 231 corresponds to the first conductive part 221. The second conductive part 231, along with the outer cover 25, functions as a detection electrode for detecting a capacitance between the second conductive part 231 and the occupant. The second conductive part 231 and the first conductive part 221 are arranged independently from each other. As shown in FIG. 7, the second conductive part 231 in the state not covering the core metal part 21 is separated from the first conductive part 221, not connected thereto. The second conductive part 231 is formed of a material having conductivity. In the present embodiment, the second conductive part 231 is the coating film formed by coating the second insulting part 233 with a coating material having conductivity. The second conductive part 231 includes a second front conductive part 231a and a second rear conductive part 231b.

The second front conductive part 231a corresponds to the first front conductive part 221a. The second front conductive part 231a is arranged so as to be in contact with the front-face part 21A of the core metal part 21. The second rear conductive part 231b corresponds to the first rear conductive part 221b. The second rear conductive part 231b is arranged so as to be in contact with the rear-face part 21B of the core metal part 21. The second shield part 232 corresponds to the first shield part 222. The second insulating part 233 corresponds to the first insulating part 223.

The second conductive terminal 234 corresponds to the first conductive terminal 224. The second conductive terminal 234 electrically connects the second conductive part 231 and the harness 30. The second conductive terminal 234 includes a second front conductive terminal 234a and a second rear conductive terminal 234b. The second front conductive terminal 234a electrically connects the second front conductive part 231a and the harness 30. The second front conductive terminal 234a is positioned closer to the other end part 230b of the second detection part 230 than to the one end part 230a. The second rear conductive terminal 234b electrically connects the second rear conductive part 231b and the harness 30. The second rear conductive terminal 234b is positioned closer to the other end part 230b of the second detection part 230 than to the one end part 230a.

The second shield terminal 235 corresponds to the first shield terminal 225. The second shield terminal 235 electrically connects the second shield part 232 and the detector 40. The second shield terminal 235 includes a second front shield terminal 235a and a second rear shield terminal 235b. The second front shield terminal 235a is positioned closer to the other end part 230b of the second detection part 230 than to the one end part 230a, and closer to the second front conductive part 231a than to the second rear conductive part 231b. The second rear shield terminal 235b is positioned closer to the other end part 230b of the second detection part 230 than to the one end part 230a, and closer to the second rear conductive part 231b than to the second front conductive part 231a.

The outer cover 25 shown in FIG. 2 covers the first covering part 22. When the outer cover 25 is in contact with the first conductive part 221 and the second conductive part 231 of the first covering part 22, the outer cover 25, along with the first conductive part 221 and the second conductive part 231, functions as a detection electrode. In the present embodiment, the outer cover 25 is formed of leather.

The harness 30 shown in FIG. 7 electrically connects the first conductive part 221 and the second conductive part 231. In detail, the harness 30 electrically connects the first conductive terminal 224 connected to the first conductive part 221, and the second conductive terminal 234 connected to the second conductive part 231, thereby electrically connecting the first conductive part 221 and the second conductive part 231. In other words, the harness 30 electrically connects the first conductive part 221 and the second conductive part 231, via the first conductive terminal 224 and the second conductive terminal 234. In the present embodiment, the harness 30 includes a first harness 310 and a second harness 320. The first harness 310 electrically connects the first front conductive part 221a and the second front conductive part 231a. In the first harness 310, one end thereof is in contact with the first front conductive terminal 224a, the second front conductive terminal 234a, the first front shield terminal 225a, and the second front shield terminal 235a, and the other end thereof is in contact with the detector 40. The second harness 320 electrically connects the first rear conductive part 221b and the second rear conductive part 231b. In the second harness 320, one end thereof is in contact with the first rear conductive terminal 224b, the second rear conductive terminal 234b, the first rear shield terminal 225b, and the second rear shield terminal 235b, and the other end thereof is in contact with the detector 40.

The detector 40 detects the gripping condition of the gripping part 20, on the basis of the change in capacitance generated in at least one of the first conductive part 221 and the second conductive part 231. The detector 40 is electrically connected to the first conductive part 221 and the second conductive part 231, via the harness 30. As shown in FIG. 3, the detector 40 is arranged between the hole 101 formed in the rotation part 10 and the bottommost part 21b of the core metal part 21. The steering device 1 having the detector 40 arranged at the position described above has better appearance compared to another embodiment of the steering device 1 having the detector 40 arranged, for example, between the rotation part 10 and the topmost part 21a of the core metal part 21. In the present embodiment, as shown in FIG. 7, the detector 40 includes a first detector 410 and a second detector 420. Although only the detector 40 is illustrated in FIG. 3, in reality the first detector 410 and the second detector 420 are arranged between the hole 101 formed in the rotation part 10 and the bottommost part 21b of the core metal part 21. As shown in FIG. 7, the first detector 410 is electrically connected to the first front conductive part 221a and the second front conductive part 231a, the first front shield terminal 225a, and the second front shield terminal 235a, via the first harness 310. The first detector 410 includes various circuits including an oscillation circuit, a resonance circuit, a detection circuit, and an amplification circuit, which are not illustrated.

When the gripping part 20 is gripped by an occupant, the capacitance between the occupant and at least one of the first front conductive part 221a and the second front conductive part 231a then changes from the capacitance of the state where the gripping part 20 is not gripped, and the resonant frequency changes. The first detector 410 modulates the changed resonant frequency using amplitude modulation, detects a signal in the detection circuit, amplifies the signal in the amplification circuit, and outputs it to an ECU (Electronic Control Unit) not shown of the vehicle VW as a voltage. The ECU detects the gripping condition of the gripping part 20, on the basis of whether the voltage value is larger than a predetermined threshold. The voltage values of the first shield part 222 and the second shield part 232 detected by the first detector 410 are used to output an accurate voltage based on the capacitance between the occupant and one of the first front conductive part 221a and the second front conductive part 231a. The second detector 420 is electrically connected to the first rear conductive part 221b and the second rear conductive part 231b, the first rear shield terminal 225b, and the second rear shield terminal 235b, via the second harness 320. The second detector 420 has the same configurations as those of the first detector 410.

In the steering device 1 in the present embodiment, the first conductive part 221 and the second conductive part 231 are positioned on the sides opposite to each other with respect to the first symmetrical plane PS1, and are arranged independently from each other. Accordingly, each of the conductive parts has a smaller area compared to an embodiment where one conductive part covers the entire outer periphery of the core metal part 21. As a result, each of the first conductive part 221 and the second conductive part 231 is less likely to experience variability in detection accuracy depending on differences in the gripped portions.

The steering device 1 includes the harness 30 which electrically connects the first conductive part 221 and the second conductive part 231, wherein the detector 40 is electrically connected, via the harness 30, to the first conductive part 221 and the second conductive part 231. The steering device 1 having the configurations described above is less likely to experience a decrease in work efficiency when the first covering part 22 is arranged on the core metal part 21 in the production of the steering device 1, compared to an example embodiment in which the terminal electrically connecting the first conductive part 221 and the detector 40 and the terminal electrically connecting the second conductive part 231 and the detector 40 are not connected via the harness 30. The steering device 1 in the present embodiment includes the first harness 310 which electrically connects the first front conductive part 221a and the second front conductive part 231a, and the second harness 320 which electrically connects the first rear conductive part 221b and the second rear conductive part 231b. The steering device 1 in the present embodiment is less likely to experience a decrease in work efficiency when the first covering part 22 is arranged on the core metal part 21 in the production of the steering device 1, compared to an example embodiment without the first harness 310 or the second harness 320.

In the present specification, the state where the first conductive part 221 is arranged on one side with respect to the symmetrical plane of the core metal part 21 while the second conductive part 231 is arranged on the other side means the state where the first conductive part 221 is arranged on one side while the second conductive part 231 is arranged on the other side, with respect to the first symmetrical plane PS1 corresponding to the symmetrical plane of the core metal part 21 configured to be symmetrical across the rotation part 10. The symmetrical plane in the above description does not include the second symmetrical plane PS2.

B. Second Embodiment

Figure 9:
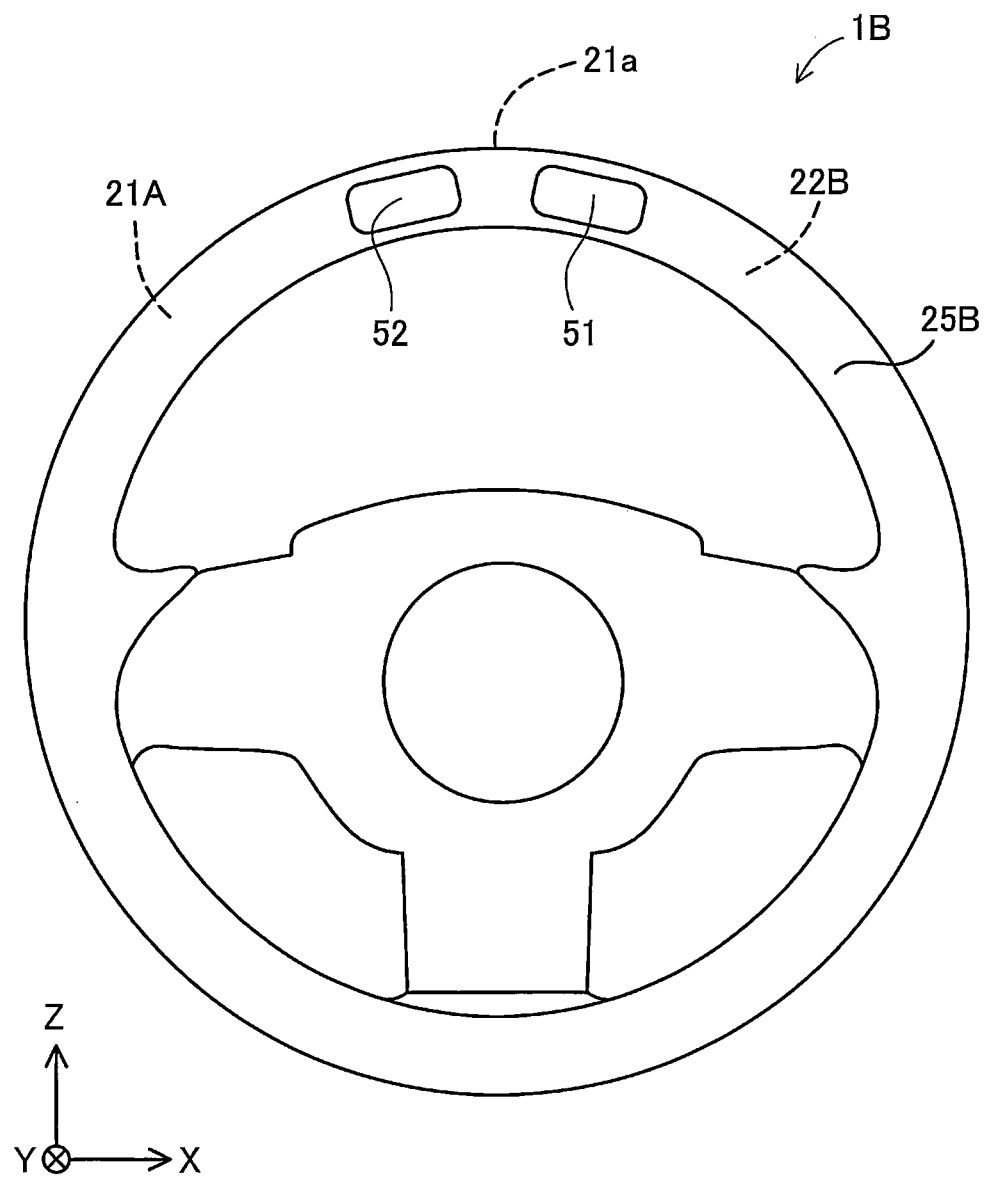
FIG. 9 is a schematic diagram illustrating a steering device in a second embodiment.

FIG. 9 is a schematic diagram illustrating a steering device 1B in the second embodiment. FIG. 9 corresponds to FIG. 2. The second embodiment differs from the first embodiment in the shape of an outer cover 25B, and in that the gripping part 20 includes a first light source 51 and a second light source 52, and that a second covering part 22B, instead of the first covering part 22, covers the core metal part 21. The second embodiment has the same configurations, except for the above, as those of the first embodiment. Accordingly, the same configurations are denoted by the same reference signs, and the detailed descriptions thereof are omitted.

The first light source 51 and the second light source 52 are configured to glow according to the situation of the vehicle VW. The first light source 51 and the second light source 52 in the present embodiment glow in order to prompt the driver DR to grip the gripping part 20. The first light source 51 and the second light source 52 are arranged on the outer surface of the core metal part 21, on the upper side in the vertical direction with respect to the rotation part 10 in the state where the rotation part 10 is at the reference angle position. In the present embodiment, the first light source 51 and the second light source 52 are arranged in line in the X direction on either side of the topmost part 21a of the core metal part 21. The first light source 51 and the second light source 52 are arranged on the front-face part 21A of the core metal part 21 on the side facing the occupant. In the present embodiment, the first light source 51 and the second light source 52 are LEDs. The first light source 51 and the second light source 52 are electrically connected to the ECU of the vehicle VW, and receive a signal from the ECU and glow.

Figure 10:
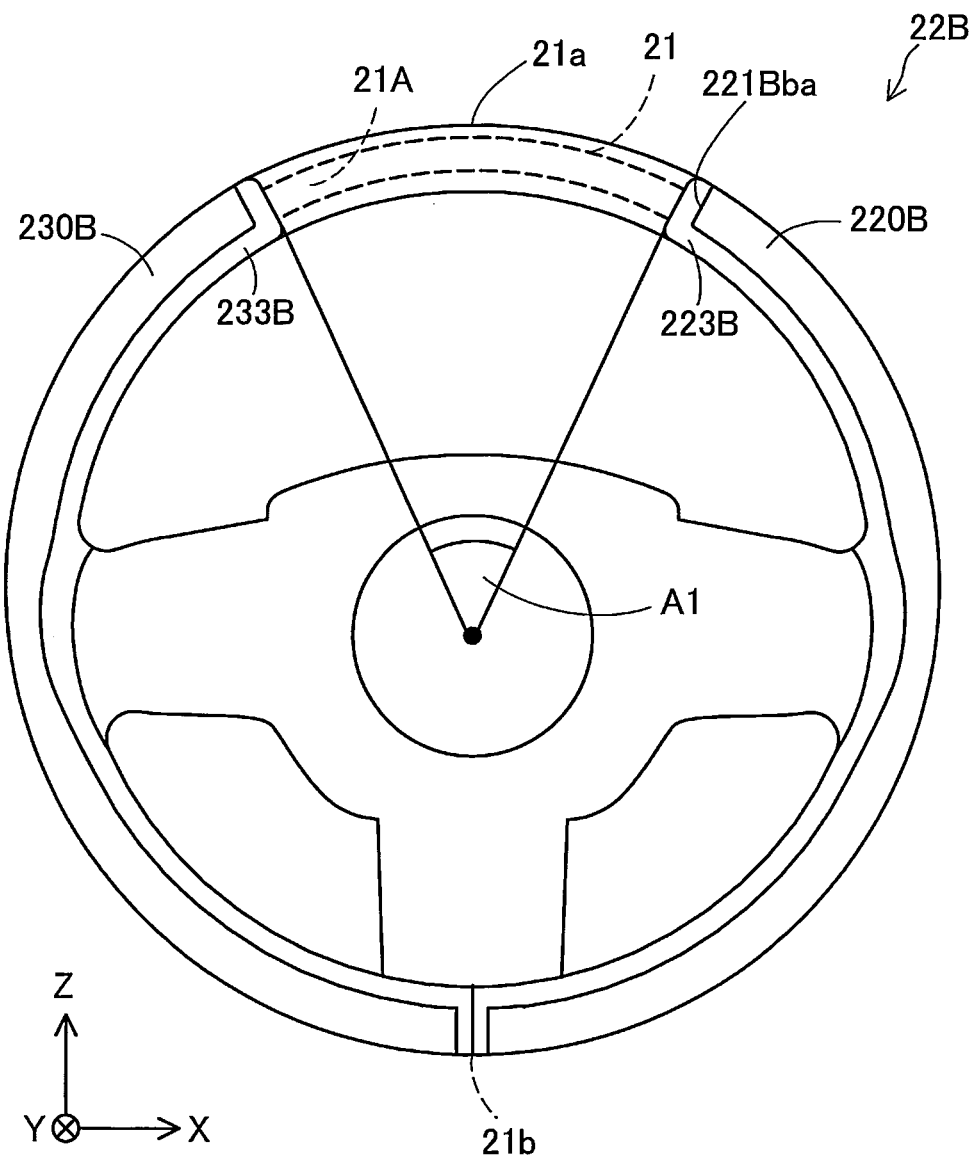
FIG. 10 is an explanatory diagram illustrating a second covering part.
Figure 11:
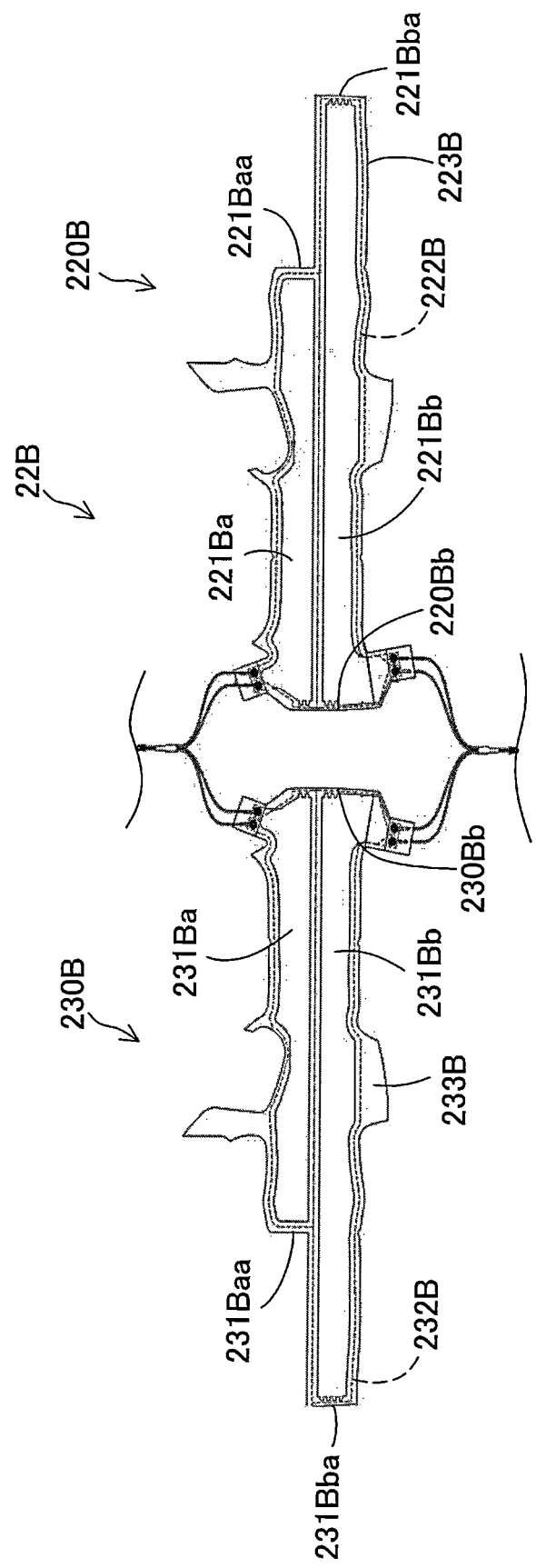
FIG. 11 shows the second covering part in the state not covering a core metal part.

FIG. 10 is an explanatory diagram illustrating the second covering part 22B. FIG. 11 shows the second covering part 22B in the state not covering the core metal part 21. The second covering part 22B has the same configurations as those of the first covering part 22. The second covering part 22B includes a first detection part 220B and a second detection part 230B. The differences from the first covering part 22 are described below. The second covering part 22B is arranged on an area of the core metal part 21 other than the first light source 51 and the second light source 52. The second covering part 22B differs from the first covering part 22 in the shapes of a first front conductive part 221Ba and a second front conductive part 231 Ba.

As shown in FIG. 11, in the first front conductive part 221Ba of the second covering part 22B, an end part 221Baa which is positioned on the side closer to the topmost part 21a of the core metal part 21 of FIG. 10 than to the bottommost part 21b is positioned closer to the bottommost part 21b, compared to an end part 221Bba of a first rear conductive part 221Bb. In other words, in the second covering part 22B in the state covering the core metal part 21, the first front conductive part 221Ba of the second covering part 22B has a length along the outer periphery of the core metal part 21 shorter than the length of the first rear conductive part 221Bb (refer to FIGS. 10 and 11). As shown in FIG. 11, a first shield part 222B and a first insulating part 223B are configured to have lengths corresponding to the length along the outer periphery of the core metal part 21 of the first front conductive part 221Ba. Accordingly, as shown in FIG. 10, there is a part not covered by the first front conductive part 221a, out of the front-face part 21A of the surface of the core metal part 21 facing the occupant and on the portion above the rotation part 10 in the vertical direction. The first light source 51 shown in FIG. 9 is arranged on the part described above. The first rear conductive part 221Bb of the second covering part 22B has the same length along the outer periphery of the core metal part 21 as the length of the first rear conductive part 221b of the first covering part 22 shown in FIG. 3, along the outer periphery of the core metal part 21.

Similarly, in the second front conductive part 231 Ba of the second covering part 22B, an end part 231 Baa which is positioned on the side closer to the topmost part 21a of the core metal part 21 than to the bottommost part 21b is positioned closer to the bottommost part 21b, compared to an end part 231Bba of a second rear conductive part 231Bb. In other words, in the second covering part 22B in the state arranged on the core metal part 21, the second front conductive part 231Ba of the second covering part 22B has a length along the outer periphery of the core metal part 21 shorter than the length of the second rear conductive part 231Bb of the second covering part 22B. As shown in FIG. 11, a second shield part 232B and a second insulating part 233B are configured to have lengths corresponding to the length along the outer periphery of the core metal part 21 of the second front conductive part 231 Ba. Accordingly, as shown in FIG. 10, there is a part not covered by the first front conductive part 221a, out of the front-face part 21A of the surface of the core metal part 21 facing the occupant and, on the portion above the rotation part 10 in the vertical direction. The second light source 52 shown in FIG. 9 is arranged on the part described above. The second rear conductive part 231Bb of the second covering part 22B has the same length along the outer periphery of the core metal part 21 as the length of the second rear conductive part 231b of the first covering part 22, along the outer periphery of the core metal part 21.

In the present embodiment, the angle of approx. 50 degrees is designated as an angle range A1 formed between the first detection part 220B and the second detection part 230B, with the center of the hole 101 formed in the rotation part 10 as the vertex, on the plane including the X axis and the Z axis, when the steering device 1 with the rotation part 10 being at the reference angle position is viewed in the positive Y direction. The angle illustrated in FIG. 10 is not accurate.

As shown in FIG. 9, the outer cover 25B in the second embodiment is configured to cover the core metal part 21 and the second covering part 22B, not to cover the first light source 51 or the second light source 52.

In the steering device 1B in the second embodiment, the gripping part 20 includes the first light source 51, the second light source 52, and the second covering part 22B. The steering device 1B with the gripping part 20 including the first light source 51 and the second light source 52 provides greater convenience because the light sources glow according to the condition of a moving object.

C. Third Embodiment

Figure 12:
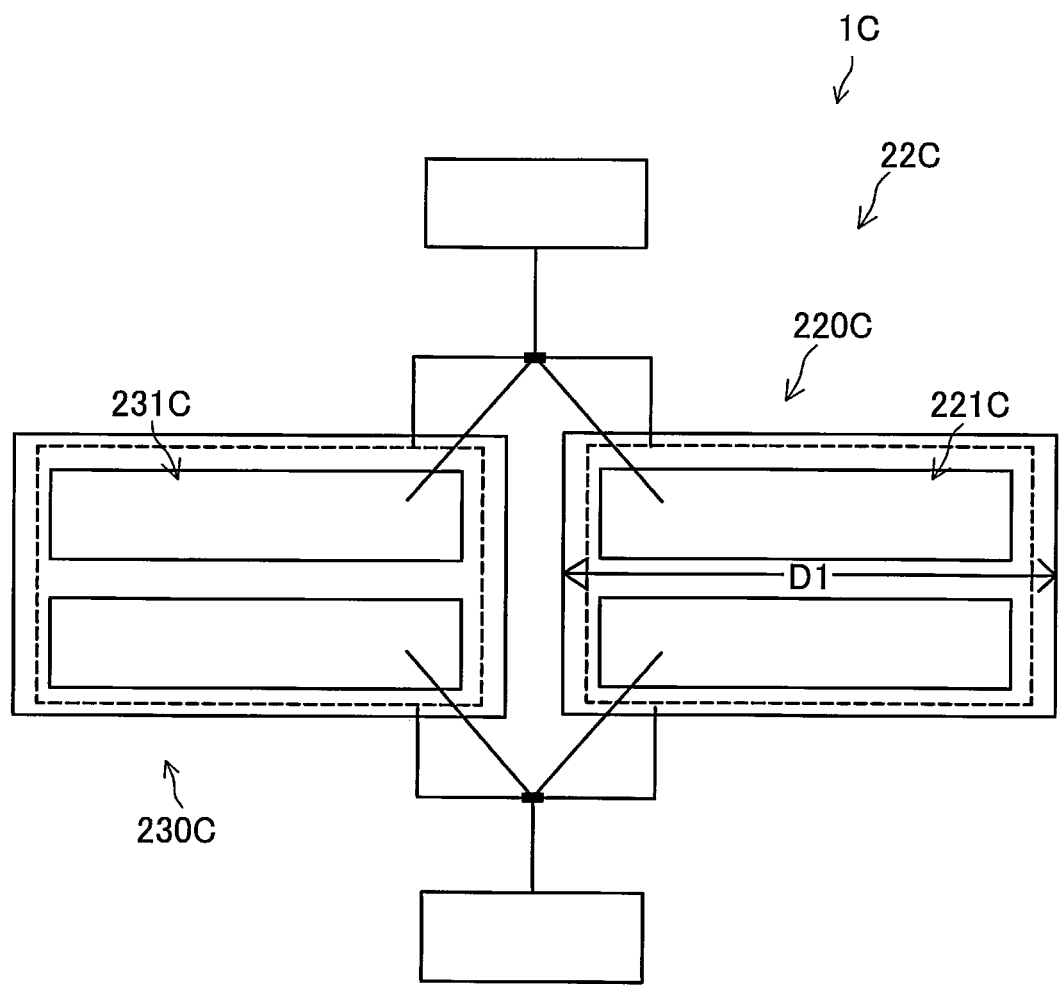
FIG. 12 is an explanatory diagram illustrating a third covering part in a third embodiment.

FIG. 12 is an explanatory diagram illustrating a third covering part 22C in the third embodiment. As shown in FIG. 12, the third embodiment differs from the first embodiment in that a steering device 1C includes the third covering part 22C, instead of the first covering part 22. The third embodiment has the same configurations, except for the above, as those of the first embodiment. Accordingly, the same configurations are denoted by the same reference signs, and the detailed descriptions thereof are omitted. The third covering part 22C has the same configurations as those of the first covering part 22. In other words, the third covering part 22C includes a first detection part 220C and a second detection part 230C. The differences from the first covering part 22 are described below.

Although not illustrated, the third covering part 22C is positioned from the part of the core metal part 21 on an upper side relative to a center of rotation of the rotation part 10 and not including the topmost part 21a, to the bottommost part 21b of the core metal part 21. In detail, the third covering part 22C is configured so that the angle A1 of approx. 50 degrees, as with the second embodiment shown in FIGS. 9 and 10, corresponds to the angle range formed between the first detection part 220C and the second detection part 230C, with the center of the hole 101 formed in the rotation part 10 as the vertex. In the third embodiment, although not illustrated, the angle of approx. 50 degrees is designated as the angle range formed between the first detection part 220C and the second detection part 230C, with the center of the hole 101 formed in the rotation part 10 as the vertex, when the steering device 1C is viewed in the negative Y direction. The third covering part 22C is thus positioned from a part of the core metal part 21 on an upper side relative to a center of rotation of the rotation part 10 and not including the topmost part 21a, to the bottommost part 21b of the core metal part 21. In other words, a first conductive part 221C and a second conductive part 231C are positioned from a part of the core metal part 21 on an upper side relative to a center of rotation of the rotation part 10 and not including the topmost part 21a, to the bottommost part 21b of the core metal part 21.

The first detection part 220C shown in FIG. 12 has a dimension D1 between one end part and the other end part thereof, while the first detection part 220 of the first covering part 22 shown in FIG. 7 has a dimension D2 between one end part and the other end part thereof, wherein the dimension D1 is smaller than the dimension D2. This also applies to the second detection part 230C of the third covering part 22C.

In the third embodiment, each of the first conductive part 221C and the second conductive part 231C is less likely to experience variability in detection accuracy depending on differences in the gripped portions, compared to an embodiment in which each of the first conductive part 221C and the second conductive part 231C is positioned from the topmost part 21a of the core metal part 21 to the bottommost part 21b. The detection of the gripping of the steering device 1C is performed in order to detect that the occupant of the moving object is in the condition to operate the moving object. In the case where the occupant grips an upper part of the gripping part 20 relative to the rotation shaft AR in the vertical direction, the occupant may not operate the steering device 1C instantly with intended direction or amount. Accordingly, in the case where the topmost part 21*a* of the core metal part 21 is gripped, there is low necessity to detect the steering device 1C as being gripped.

D. Other Embodiments

D1. Other Embodiments 1

(1) In the embodiments described above, the steering device 1 is mounted on the vehicle VW. A steering device may be mounted on a moving object other than a vehicle, for example, a ship or an aircraft.

(2) In the embodiments described above, the core metal part 21 is configured to be symmetrical with respect to the second symmetrical plane PS2 which is the plane including the X axis and the Z axis, in the state where the rotation part 10 is at the reference angle position. A core metal part may not be configured to be symmetrical with respect to the plane including both the X axis and the Z axis.

(3) In the embodiments described above, the gripping part 20 has a substantially annular shape. In another embodiment, a gripping part may have a rectangular or trapezoid appearance when viewed in the Y-axis direction. In another embodiment, a gripping part may have a substantially square shape surrounding a rotation part. A gripping part may have the shape in which the gripping part is connected to the left and right parts and the lower part in the vertical direction of a rotation part in the state where the rotation part is at the reference angle position. A gripping part may be two bar-like members arranged on the left and right sides of a rotation part in the state where the rotation part is at the reference angle position. In the case where a gripping part may have a shape not a substantially annular shape, the topmost part of a core metal part may not be positioned on the upper side in the vertical direction with respect to a rotation part, or the bottommost part of the core metal part may not be positioned on the lower side in the vertical direction with respect to the rotation part, in the state where the rotation part is at the reference angle position.

(4) In the embodiments described above, the core metal 210 is formed of an alloy such as iron, aluminum, or magnesium. In another embodiment, a core metal may be formed solely of iron, aluminum, or magnesium.

(5) In the embodiments described above, the soft covering part 211 is formed of polyurethane foam. A soft covering part may be formed of a soft material other than polyurethane foam.

(6) In the first embodiment described above, the first covering part 22 is positioned from the topmost part 21*a* of the core metal part 21 to the bottommost part 21*b*. In other words, the first covering part 22 covers the entire core metal part 21. A first covering part may be configured to at least partially cover a core metal part. In another embodiment, a first covering part may be positioned from the part of the core metal part above the center of rotation of the rotation part and not including the topmost part, to the part of the core metal part below the center of rotation of the rotation part and not including the bottommost part.

(7) In the embodiments described above, the first conductive part 221 and the second conductive part 231 are the coating films formed by coating the first insulting part 223 and the second insulating part 233 with a coating material having conductivity, respectively. In another embodiment, a first conductive part and a second conductive part may be sheet-like members having conductivity, respectively.

(8) In the embodiments described above, the first detection part 220 includes the first shield part 222, while the second detection part 230 includes the second shield part 232. The first shield part 222 and the second shield part 232 are formed by coating the first insulting part 223 and the second insulting part 233 with a coating material containing a material having conductivity, respectively. In another embodiment, a first detection part may not include a first shield part, while a second detection part may not include a second shield part. In another embodiment, a first shield part and a second shield part may be sheet-like members having conductivity.

(9) In another embodiment, a first conductive part and a second conductive part may be configured to cover the outer periphery of a core metal part, not to cover the inner periphery thereof. In many cases, an occupant, when gripping a gripping part, grips a portion closer to the outer periphery of the core metal part, than to the inner periphery. Accordingly, the first conductive part and the second conductive part may be configured to cover the outer periphery of the core metal, not to cover the inner periphery, allowing the surface areas of the first conductive part and the second conductive part to be reduced while still enabling the detection of the gripping by the occupant.

(10) In the embodiments described above, the first front conductive terminal 224*a* is positioned closer to the other end part 220*b* of the first detection part 220 than to the one end part 220*a*, and the first rear conductive terminal 224*b* is positioned closer to the other end part 220*b* of the first detection part 220 than to the one end part 220*a*. In another embodiment in which a detector is positioned between the topmost part of a core metal part and a rotation part, a first front conductive terminal and a first rear conductive terminal may be positioned closer to one end part of a first detection part. Similarly, a second front conductive terminal and a second rear conductive terminal may be positioned closer to one end part of a second detection part.

(11) In the first embodiment described above, the first conductive part 221 and the second conductive part 231 are positioned from the vicinity of the topmost part 21*a* of the core metal part 21 to the vicinity of the bottommost part 21*b*. In another embodiment, a first conductive part and a second conductive part may be positioned from the topmost part of a core metal part to the bottommost part so as not to be in contact with each other.

Figure 13:
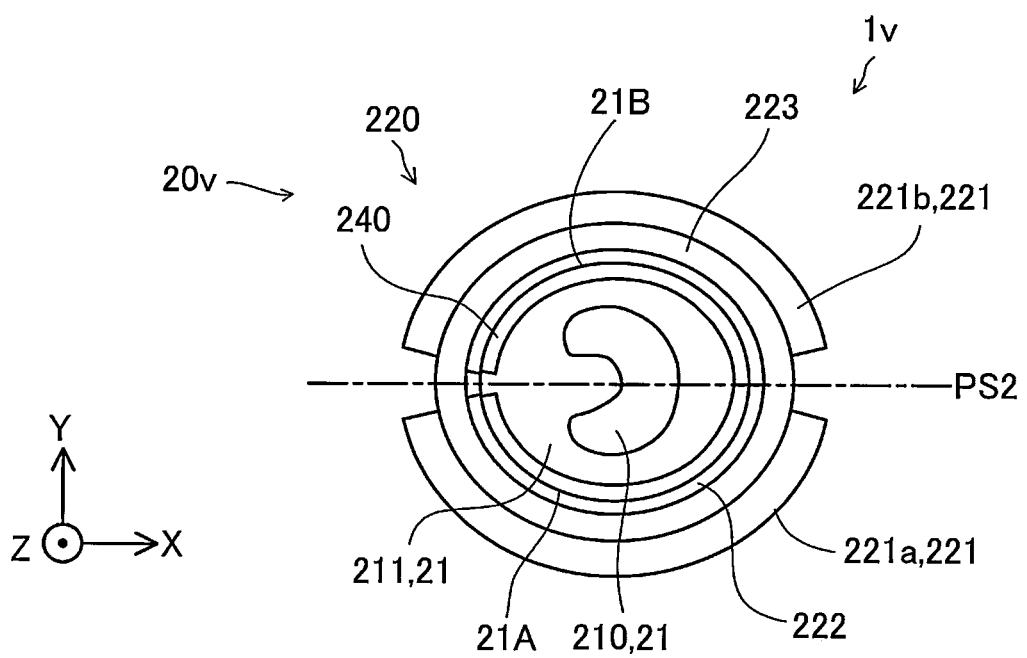
FIG. 13 shows a cross-sectional view of the steering device 1v that is a variant of the above first embodiment.

(12) FIG. 13 shows a cross-sectional view of the steering device 1*v* that is a variant of the above first embodiment. FIG. 13 corresponds to FIG. 8 of the first embodiment. The steering device 1*v* has a heater part 240 between the surface of the core metal part 21 and the first shield part 222. Other aspects of the steering device 1*v* are the same as the steering device 1 of the first embodiment.

The heater part 240 has, as its main configuration, a flexible sheet-like configuration with an abbreviated rectangular outline. The heater part 240 can be constructed, for example, by depositing carbon or metal plating on a resin sheet such as PET (polyethylene terephthalate) or polyamide.

The heater part 240 is arranged on the surface of the core metal part 21 so that the two long sides of the rectangle face each other at a position on the surface of the core metal part 21 facing the rotating section 10. The heater part 240 is connected to a power source. The heater part 240 generates heat by being supplied with electric power from the power source. As a result, the heat is transmitted to the surface of the first conductive part 221. Therefore, the occupant can comfortably hold the gripping part 20v of the steering device 1v even in winter when the temperature is low.

Because the first shield part 222 is arranged between the heater part 240 and the first conductive part 221, no electrostatic capacitance is generated between the heater part 240 and the first conductive part 221. As a result, the detection of gripping of the gripping part 20v using the first conductive part 221 is performed stably.

In this variation, the heater part 240 has a sheet-like configuration having an abbreviated rectangular outline and flexibility. However, the heater part 240 can also be configured by applying conductive paint to the surface of the first shield part 222.

In the above, the configuration and functions of the steering device 1v were described using the side of the steering device 1v on which the first detection part 220 is located with respect to the first symmetry plane PS1 as an example (see the lower right part of FIG. 3). The steering device 1v has the same configuration for the side where the second detection part 230 is arranged with respect to the first symmetry plane PS1 (see the lower right part of FIG. 3).

D2. Other Embodiments 2

(1) In the embodiments described above, the first conductive part 221 includes the first front conductive part 221a and the first rear conductive part 221b, while the second conductive part 231 includes the second front conductive part 231a and the second rear conductive part 231b. In another embodiment, a first conductive part may be one conductive part positioned from a front-face part to a rear-face part of the surface of a core metal part, while a second conductive part may be one conductive part positioned from a front-face part to a rear-face part of the surface of the core metal part. In another embodiment, a first conductive part may include a first front conductive part and a first rear conductive part, while a second conductive part may be one conductive part positioned from a front-face part to a rear-face part of the surface of a core metal part. In another embodiment, a second conductive part may include a second front conductive part and a second rear conductive part, while a first conductive part may be one conductive part positioned from a front-face part to a rear-face part of the surface of a core metal part.

(2) In the embodiments described above, the harness 30 includes the first harness 310 and the second harness 320. In another embodiment in which a first conductive part includes a first front conductive part and a first rear conductive part, while a second conductive part is one conductive part positioned from a front-face part to a rear-face part of the surface of a core metal part, one harness may electrically connect the first front conductive part and the second conductive part. In another embodiment in which a second conductive part includes a second front conductive part and a second rear conductive part, while a first conductive part is one conductive part positioned from a front-face part to a rear-face part of the surface of a core metal part, one harness may electrically connect the second front conductive part and the first conductive part. In another embodiment in which each of a first conductive part and a second conductive part is one conductive part positioned from a front-face part to a rear-face part of the surface of a core metal part, one harness may connect the first conductive part and the second conductive part.

(3) In the embodiments described above, the detector 40 includes the first detector 410 and the second detector 420. In another embodiment in which each of a first conductive part and a second conductive part is one conductive part positioned from a front-face part to a rear-face part of the surface of a core metal part, a detector may detect the gripping condition of a gripping part, on the basis of the change in capacitance generated in at least one of the first conductive part and the second conductive part.

D3. Other Embodiments 3

(1) In the third embodiment described above, the core metal part 21 has an annular shape, and the third covering part 22C is positioned from the part of the core metal part 21 on an upper side relative to a center of rotation of the rotation part 10 and not including the topmost part 21a, to the vicinity of the bottommost part 21b of the core metal part 21. In another embodiment in which a core metal part has a substantially square shape surrounding a rotation part, a first conductive part and a second conductive part may be positioned from the part of the core metal part on an upper side relative to a center of rotation of the rotation part and not including the topmost part, to the vicinity of the bottommost part of the core metal part, respectively.

(2) In the second and third embodiments described above, the angle of approx. 50 degrees is designated as the angle range A1 formed between the first detection part and the second detection part, with the center of the hole 101 formed in the rotation part 10 as the vertex, on the plane including the X axis and the Z axis when the steering device 1 with the rotation part 10 being at the reference angle position is viewed in the positive Y direction. In another embodiment, the angle of 10 degrees or 90 degrees may be designated as the angle range formed between a first rear conductive part and a second rear conductive part.

(3) In the embodiments described above, the first conductive part 221 and the second conductive part 231 have the same length along the outer periphery of the core metal part 21. A first conductive part and a second conductive part may have different lengths along the outer periphery of a core metal part. In another embodiment, a first conductive part may have a shorter length along the outer periphery of a core metal part than the length of a second conductive part, along the outer periphery of the core metal part.

D4. Other Embodiments 4

(1) In the second embodiment described above, the core metal part 21 has an annular shape, and the gripping part 20 includes two light sources arranged on the front-face part 21A of the core metal part 21, on the upper side in the vertical direction with respect to the rotation part 10. In another embodiment in which a core metal part has a substantially square shape surrounding a rotation part, two light sources may be arranged on a rear side in a moving object of a core metal part, on the upper side in the vertical direction with respect to the rotation part.

(2) In the second embodiment described above, the gripping part 20 includes two light sources arranged on the upper side in the vertical direction with respect to the rotation part 10. In another embodiment, a gripping part may include at least one light source arranged on a side other than the upper side in the vertical direction with respect to a rotation part. In the embodiment above, a covering part is arranged on an area other than the light source of a core metal part.

(3) In the second embodiment described above, the angle of approx. 50 degrees is designated as the angle range A1 formed between the first detection part and the second detection part, with the center of the hole 101 formed in the rotation part 10 as the vertex, on the plane including the X axis and the Z axis. In another embodiment, a first detection part may be arranged in the vicinity of a first light source, while a second detection part may be arranged in the vicinity of a second light source, so as not to cover the first light source or the second light source illustrated in FIG. 9.

(4) In the second embodiment described above, the gripping part 20 includes two light sources of the first light source 51 and the second light source 52. A gripping part may include one or three light sources, not two. A light source may flicker in order to prompt an occupant to grip a gripping part, or may glow when the occupant is not gripping the gripping part.

E. Variations

The present disclosure may be embodied in the following aspects.

(1) In one aspect of the present disclosure, a steering device is provided. The steering device, which is mounted on a moving object, includes a rotation part attached to the moving object so as to be rotatable, and a gripping part connected to the rotation part; the gripping part includes a core metal part configured to be symmetrical across the rotation part, and a covering part configured to at least partially cover the core metal part; the covering part has a first conductive part arranged on one side with respect to a symmetrical plane of the core metal part, formed of a material having conductivity, and a second conductive part arranged on the other side with respect to the symmetrical plane of the core metal part, formed of a material having conductivity; the first conductive part and the second conductive part are arranged independently from each other; the steering device further includes a harness electrically connecting the first conductive part and the second conductive part, and a detector electrically connected to the first conductive part and the second conductive part via the harness, configured to detect gripping condition of the gripping part based on change in capacitance generated in at least one of the first conductive part and the second conductive part.

In the steering device in the aspect above, the first conductive part and the second conductive part are positioned on the sides opposite to each other with respect to the symmetrical plane, and are arranged independently from each other. Each of the conductive parts thus has a smaller area, compared to the aspect where one conductive part covers the entire outer periphery of a core metal part. As a result, each of the first conductive part and the second conductive part is less likely to experience variability in detection accuracy depending on differences in the gripped portions.

(2) In the steering device in the aspect above, the gripping part may be configured to be gripped by an occupant; a surface of the core metal part includes a front-face part on a side facing the occupant, and a rear-face part on a side opposite to the front-face part, the first conductive part may include a first front conductive part arranged in contact with the front-face part, and a first rear conductive part arranged in contact with the rear-face part, while the second conductive part may include a second front conductive part arranged in contact with the front-face part, and a second rear conductive part arranged in contact with the rear-face part; and the harness may include a first harness electrically connecting the first front conductive part and the second front conductive part, and a second harness electrically connecting the first rear conductive part and the second rear conductive part.

(3) In the steering device in the aspect above, the core metal part may have an annular shape; when the rotation part is at a reference angle position, a topmost part that is a highest part in a vertical direction of the core metal part may be positioned on an upper side in the vertical direction with respect to the rotation part, and the covering part may be positioned from a part of the core metal part on an upper side relative to a center of rotation of the rotation part and that does not include the topmost part, to a bottommost part corresponding to a lowest part in the vertical direction of the core metal part. In the steering device in the aspect above, each of the first conductive part and the second conductive part is less likely to experience variability in detection accuracy depending on differences in the gripped portions, compared to the aspect where the first conductive part and the second conductive part are positioned from the topmost part of the core metal part to the bottommost part, respectively.

The detection of the gripping of the steering device is performed in order to detect that the occupant of the moving object is in the condition to operate the moving object. In the case where the occupant grips the topmost part of the gripping part in the vertical direction, the occupant may not operate the steering device instantly with intended direction or amount. Accordingly, in the case where the topmost part of the core metal part is gripped, there is low necessity to detect the steering device as being gripped.

(4) In the steering device in the aspect above, the gripping part may be configured to be gripped by the occupant; the surface of the core metal part may include the front-face part on the side facing the occupant, and the rear-face part on the side opposite to the front-face part; the core metal part may have an annular shape; the gripping part may further include at least one light source positioned on an upper side in a vertical direction with respect to the rotation part when the rotation part is at a reference angle position, on the front-face part of the core metal part, configured to glow according to a situation of the moving object; and the covering part may be arranged on the core metal part other than the position where the light source is arranged.

In the steering device in the aspect above, the gripping part may include the light source and the covering part.

The present disclosure may be embodied in various aspects, for example, a vehicle equipped with the steering device, and a method of producing the steering device.

The present disclosure may be embodied in various configurations without departing from the spirit of the present disclosure, not limited to the above-described embodiments. For example, the technical features in the embodiments corresponding to the technical features in the respective aspects disclosed above may be appropriately replaced or combined in order to solve some or all of the above-described problems, or in order to achieve some or all of the above-described effects. Any of the technical features not described as essential in the present specification may be omitted appropriately.

What is claimed is:

1. A steering device mounted on a moving object, the steering device comprising:
a rotation part attached to the moving object so as to be rotatable; and
a gripping part connected to the rotation part, wherein the gripping part includes:

a core metal part configured to be symmetrical across the rotation part; and
a covering part configured to at least partially cover the core metal part, wherein
the covering part includes:
a first conductive part arranged on one side with respect to a symmetrical plane of the core metal part, the first conductive part formed of a material having conductivity; and
a second conductive part arranged on the other side with respect to the symmetrical plane of the core metal part, the second conductive part formed of a material having conductivity, wherein
the first conductive part and the second conductive part are arranged independently from each other, wherein
the steering device further comprises:
a harness electrically connecting the first conductive part and the second conductive part; and
a detector electrically connected to the first conductive part and the second conductive part via the harness, the detector configured to detect gripping condition of the gripping part based on change in capacitance generated in at least one of the first conductive part and the second conductive part,
wherein
the gripping part is configured to be gripped by an occupant, wherein
a surface of the core metal part includes:
a front-face part on a side facing the occupant; and
a rear-face part on a side opposite to the front-face part, wherein the first conductive part includes:
a first front conductive part arranged in contact with the front-face part; and
a first rear conductive part arranged in contact with the rear-face part, and the second conductive part includes:
a second front conductive part arranged in contact with the front-face part; and
a second rear conductive part arranged in contact with the rear-face part, wherein the harness includes:
a first harness electrically connecting the first front conductive part and the second front conductive part; and
a second harness electrically connecting the first rear conductive part and the second rear conductive part.

2. A steering device mounted on a moving object, the steering device comprising:
a rotation part attached to the moving object so as to be rotatable; and
a gripping part connected to the rotation part, wherein the gripping part includes:
a core metal part configured to be symmetrical across the rotation part; and
a covering part configured to at least partially cover the core metal part, wherein
the covering part includes:
a first conductive part arranged on one side with respect to a symmetrical plane of the core metal part, the first conductive part formed of a material having conductivity; and
a second conductive part arranged on the other side with respect to the symmetrical plane of the core metal part, the second conductive part formed of a material having conductivity, wherein
the first conductive part and the second conductive part are arranged independently from each other, wherein
the steering device further comprises:
a harness electrically connecting the first conductive part and the second conductive part; and
a detector electrically connected to the first conductive part and the second conductive part via the harness, the detector configured to detect gripping condition of the gripping part based on change in capacitance generated in at least one of the first conductive part and the second conductive part,
wherein
the core metal part has an annular shape, wherein
when the rotation part is at a reference angle position,
a topmost part that is a highest part in a vertical direction of the core metal part is positioned on an upper side in the vertical direction with respect to the rotation part, and
the covering part is positioned from a part of the core metal part on an upper side relative to a center of rotation of the rotation part and not including the topmost part, to a bottommost part corresponding to a lowest part in the vertical direction of the core metal part.

3. A steering device mounted on a moving object, the steering device comprising:
a rotation part attached to the moving object so as to be rotatable; and
a gripping part connected to the rotation part, wherein the gripping part includes:
a core metal part configured to be symmetrical across the rotation part; and
a covering part configured to at least partially cover the core metal part, wherein
the covering part includes:
a first conductive part arranged on one side with respect to a symmetrical plane of the core metal part, the first conductive part formed of a material having conductivity; and
a second conductive part arranged on the other side with respect to the symmetrical plane of the core metal part, the second conductive part formed of a material having conductivity, wherein
the first conductive part and the second conductive part are arranged independently from each other, wherein
the steering device further comprises:
a harness electrically connecting the first conductive part and the second conductive part; and
a detector electrically connected to the first conductive part and the second conductive part via the harness, the detector configured to detect gripping condition of the gripping part based on change in capacitance generated in at least one of the first conductive part and the second conductive part,
wherein
the gripping part is configured to be gripped by the occupant, wherein
a surface of the core metal part includes:
a front-face part on the side facing the occupant; and
a rear-face part on the side opposite to the front-face part, wherein
the core metal part has an annular shape, wherein
the gripping part further includes:
at least one light source positioned on an upper side in a vertical direction with respect to the rotation part when the rotation part is at a reference angle position, on the front-face part of the core metal part, wherein the light source is configured to glow according to a situation of the moving object, wherein the covering part is arranged on the core metal part other than a position where the at least one light source is arranged.

\* \* \* \* \*